United States Patent
Kroeger et al.

(10) Patent No.: US 11,655,854 B2
(45) Date of Patent: May 23, 2023

(54) ROLLING-ELEMENT BEARING ASSEMBLY

(71) Applicant: AKTIEBOLAGET SKF, Gothenburg (SE)

(72) Inventors: Jan Kroeger, Elmshorn (DE); Peter Lemper, Hitzacker (DE); Hans-Juergen Liesegang, Schortens (DE); Klaus-Dieter Schulz, Jameln (DE)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 17/088,728

(22) Filed: Nov. 4, 2020

(65) Prior Publication Data

US 2021/0140483 A1  May 13, 2021

(30) Foreign Application Priority Data

Nov. 11, 2019  (DE) .......................... 102019217381.0

(51) Int. Cl.
  *F16C 33/78*  (2006.01)
  *F16C 43/04*  (2006.01)

(52) U.S. Cl.
  CPC ........ *F16C 33/783* (2013.01); *F16C 33/7813* (2013.01); *F16C 33/7823* (2013.01); *F16C 33/7886* (2013.01); *F16C 33/7896* (2013.01); *F16C 43/045* (2013.01); *F16C 2300/14* (2013.01)

(58) Field of Classification Search
  CPC ............. F16C 33/7813; F16C 33/7816; F16C 33/782; F16C 33/7823; F16C 33/783; F16C 33/7853; F16C 33/7886; F16C 33/805; F16C 43/045; F16C 2300/14
  See application file for complete search history.

(56) References Cited

U.S. PATENT DOCUMENTS

| | | | |
|---|---|---|---|
| 3,396,975 A | 8/1968 | Lee | |
| 6,082,721 A * | 7/2000 | Kingsley | F16B 11/008 267/276 |

(Continued)

FOREIGN PATENT DOCUMENTS

| | | |
|---|---|---|
| DE | 20203372 U1 | 6/2002 |
| DE | 102009014923 A1 | 9/2010 |

(Continued)

OTHER PUBLICATIONS

Machine Translation of JP-2014088891-A (Year: 2014).*

(Continued)

*Primary Examiner* — Alan B Waits
(74) *Attorney, Agent, or Firm* — J-Tek Law PLLC; Scott T. Wakeman; Mark A. Ussai

(57) ABSTRACT

A rolling-element bearing assembly includes a first bearing ring and a second bearing ring that define a bearing interior between them, a plurality of rolling elements disposed in the bearing interior to allow a relative rotation of first and second bearing rings, and a seal assembly for sealing the bearing interior. The seal assembly includes a seal carrier that is connected to the first bearing ring such that they rotate together and a seal element that is connected to the seal carrier such that they rotate together, and the seal carrier comprises a fiber-reinforced plastic.

10 Claims, 4 Drawing Sheets

(56) References Cited

U.S. PATENT DOCUMENTS

| | | | |
|---|---|---|---|
| 8,535,009 B2 | 9/2013 | Hofmann | |
| 9,347,495 B2 | 5/2016 | Ito | |
| 2015/0167743 A1* | 6/2015 | Yamauchi | F16C 33/7833 384/462 |
| 2020/0025252 A1* | 1/2020 | Rettinger | F16J 15/3216 |
| 2020/0063799 A1* | 2/2020 | Pilk | F16C 19/386 |
| 2021/0140485 A1 | 5/2021 | Kroeger et al. | |

FOREIGN PATENT DOCUMENTS

| | | | | |
|---|---|---|---|---|
| DE | 202011109164 U1 | | 1/2012 | |
| DE | 102010044173 A1 | | 5/2012 | |
| DE | 102010053203 A1 | | 6/2012 | |
| DE | 102011121281 A1 | | 6/2013 | |
| DE | 102013200356 A1 | | 8/2013 | |
| DE | 102012213508 A1 | * | 2/2014 | F16J 15/3272 |
| DE | 102017107005 B3 | | 9/2018 | |
| EP | 1873428 A1 | | 1/2008 | |
| EP | 2527694 A1 | | 11/2012 | |
| EP | 2620643 A1 | | 7/2013 | |
| EP | 2863083 A1 | | 4/2015 | |
| EP | 2940329 A1 | | 11/2015 | |
| JP | 2009264404 A | | 11/2009 | |
| JP | 2011089619 A | | 5/2011 | |
| JP | 2014088891 A | * | 5/2014 | F16C 33/78 |
| JP | 2014088891 A | | 5/2014 | |
| WO | 2015169650 A1 | | 11/2015 | |
| WO | WO-2018174979 A1 | * | 9/2018 | |
| WO | 2018185288 A1 | | 10/2018 | |
| WO | WO-2018210372 A1 | * | 11/2018 | |

OTHER PUBLICATIONS

Machine Translation of DE-102012213508-A1 (Year: 2014).*
Machine Translation of WO-2018210372-A1 (Year: 2018).*
European Search Report from the European Patent Office dated Mar. 22, 2021 in related application No. EP 20 20 6374, including European Search Opinion, and translation thereof.
European Search Report from the European Patent Office dated Mar. 23, 2021 in related application No. EP 20 20 6376, including European Search Opinion, and translation thereof.
Office Action from the United States Patent Office dated Oct. 1, 2021 in related U.S. Appl. No. 17/088,719.

* cited by examiner

ROLLING-ELEMENT BEARING ASSEMBLY

CROSS-REFERENCE

This application claims priority to German patent application no. 10 2019 217 381.0 filed on Nov. 11, 2019, the contents of which are fully incorporated herein by reference.

TECHNOLOGICAL FIELD

The present disclosure is directed to a rolling-element bearing assembly, in particular a double row tapered roller bearing, wherein the rolling-element bearing assembly has a diameter of more than one meter.

BACKGROUND

Rolling-element bearing assemblies having large diameters are used in particular in heavy industry and are characterized in that they have a diameter of at least one meter and more, and are therefore also referred to as "large rolling-element bearings." Large rolling-element bearings are thus significantly larger than those that are usually used in everyday applications, such as, for example, in automobiles. Accordingly, in the construction of the large rolling-element bearing an upscaling of small bearings to large bearings is also not possible, since other criteria, such as, for example, weight, the material usage required for manufacturing, installation cost, and repair possibilities, etc. play a significantly greater role.

It is already known from the prior art, for example, to assemble the bearing rings from a plurality of segments, whereby a repair of the bearing is possible without, for example, removing the shaft supported by the bearing. However, with such large rolling-element bearings their own weight is problematic in particular. It has therefore already been proposed in the prior art, in particular DE 102009014923 A1 (family member of U.S. Pat. No. 8,535,009 B2), to downsize the outer ring axially in order to save material and to reduce the total weight. However, for this purpose it is necessary to redesign the sealing situation of the bearing rings or of the bearing interior. It has therefore already been proposed in this publication to axially attach so-called seal carriers to the end surfaces of the outer ring, which seal carriers carry a radial shaft seal ring that in turn abuts against a radial surface of the inner ring.

A plurality of screws are usually used for attaching such seal carriers in order to securely screw the seal carrier rings onto the outer rings. This installation effort and also the manufacturing of the rings are therefore very time and cost intensive. Although it has been proposed in the prior art to also manufacture the seal carriers from partial segments and to thereby simplify the installation, it is, however, necessary to form special attachment surfaces on the seal carriers and the outer rings in order to enable a secure attachment of the seal carrier to the outer rings, such that the seal carrier and outer rings rotate together, even without screws. It is thus proposed to form undercuts on the seal carriers, which undercuts can engage in corresponding complementary undercuts formed on the outer ring. An easier attachment is thereby made possible. However, this design requires an additional processing of a seal carrier and outer ring, which is in turn also very cost and time intensive.

SUMMARY

It is therefore an aspect of the present disclosure to provide a seal carrier that is manufactured economically and in a time-saving manner, and that is easily attachable to the rolling-element bearing assembly.

This object is made possible by a rolling-element bearing assembly, in particular a double row tapered roller bearing.

In the following a rolling-element bearing assembly is presented including a first bearing ring and a second bearing ring that form a bearing interior between them, wherein rolling elements are disposed in order to allow for a relative rotation of the first and second bearing rings. Such a rolling-element bearing assembly can in particular be a double row tapered roller bearing. Furthermore, such a rolling-element bearing assembly is usable in particular for heavy industry, wherein the first and/or the second bearing ring have a diameter of more than one meter. Furthermore, the rolling-element bearing assembly includes a seal assembly for sealing the bearing interior, wherein the seal assembly includes a seal carrier that is connected to the first bearing ring such that they rotate together, and a seal element that is connected to the seal carrier such that they rotate together.

In order to reduce the total weight of the rolling-element bearing assembly and the manufacturing costs and the production time, the seal carrier may be manufactured from a fiber-reinforced plastic. Here in in particular a fiberglass-reinforced plastic (FRP) is used. Such a plastic is particularly dimensionally stable and has a comparably high, if not higher, stability than the metal-plate material usually used.

In order to achieve the necessary stability and dimensional stability even with large rolling-element bearings, however, the seal carrier is preferably not manufactured from layers as usual, but rather is compression-molded from a fiber matrix composite plate (SMC method). A post-processing of the seal carrier is not necessary. On the one hand the manufacturing process can thereby be accelerated, and on the other hand defects that can arise due to faulty laminating of the fiber-reinforced plastic can thereby be avoided. In addition, using the compression-molded fiber matrix, composite plates a high dimensional accuracy can be achieved, so that other seal concepts that have, for example, a purely axial sealing instead of the use of a radial shaft seal are also possible.

Thus, for example, a rolling-element bearing assembly is furthermore preferred wherein the seal carrier carries a seal element that includes a primary and a secondary seal lip that each axially abut against an axial end surface of the second bearing ring. Here in particular the distance between the seal carrier and the end side of the second bearing ring determines the contact force of the seal lips against the end side of the second bearing ring. Since the seal carrier can be manufactured to be particularly dimensionally stable and precise using the fiber-reinforced plastic, the axial distance between end side of the second bearing ring and seal carrier can be precisely set to ensure that the axially abutting seal lips have a sufficient contact force to ensure in every operating situation of the bearing that the bearing interior is sealed from an exterior.

Furthermore, the design of the seal carrier made from a fiber-reinforced plastic, in particular from FRP, makes it possible that structures, such as, for example, grease-supply bores, endoscopy bores, and venting bores can be introduced directly during manufacturing. This is made possible with an accurate fit and shape in particular with compression molded fiber-matrix-composite plates.

Furthermore it is possible to form further elements, such as, for example, an attachment groove for receiving the seal element, directly in the manufacturing process of the seal carrier.

According to a further advantageous exemplary embodiment, the seal carrier can be configured multi-part. In order to achieve a particularly good connection and an axial, radial, and/or circumferential orientation of the seal carrier segments, the seal carrier segments include mutually complementary structures on their connecting surfaces, which structures allow for a one-to-one arrangement and connection of the seal carrier segments. These complementary structures can also be introduced directly during the manufacturing process of the seal carrier by compression molding.

Here it is preferred in particular that the structure comprises a radial and/or an axial stop, so that the seal carrier segments can be radially and axially aligned with respect to one another.

In order to attach the seal element to the seal carrier a clamping ring may be used that is configured to axially clamp the seal element between the seal carrier and the clamping element, and thereby secure the seal element against rotation. In addition to an attachment by clamping, additionally or alternatively the seal element can also be attached to the clamping ring and/or seal carrier by a friction-fit, in particular using a further attachment element (e.g., screws). It is also possible that the seal element and the clamping ring and the seal carrier include structures interacting with one another in an interference-fit manner, which structures also make possible an attachment of the seal element to the seal carrier with the aid of the clamping ring. Additionally or alternatively the seal element can also be attached to the seal carrier and/or the clamping ring in a materially-bonded manner, wherein in particular an adhering is preferred. Of course other or additional attachment possibilities of the seal element to the seal carrier or the clamping ring are equally possible and are included in the scope of the disclosure.

The seal element itself can preferably include a seal body that supports both the primary and the secondary seal lip, so that the seal element is configured as a one-piece element. However, other designs are also possible in which primary and secondary seal lips are carried by different seal bodies. The one-piece design has the advantage that only one seal element need be attached to the seal carrier, which in turn simplifies manufacturing and installation.

In addition to the distance between seal carrier and end surface, a length of the seal lip, an angle of incidence of the seal lip with respect to the end surface, a material of the seal lip, and/or a geometric design of the seal lip determine the contact force of the seal lip, in particular of the primary seal lip, against the axial end surface of the bearing ring. It is thus preferred that the primary and the secondary seal lip form a lip-spread angle between them that falls in the range from 100° to 140°, preferably at approximately 120°, wherein the primary and the secondary seal lip are oriented such that the primary seal lip is directed toward the bearing interior and the secondary seal lip in the opposite direction. An optimized seal lip system on the end surface of the second bearing ring can thereby be achieved even in the axial orientation.

Furthermore the seal element is preferably manufactured from nitrile butadiene rubber or hydrogenated acrylonitrile butadiene rubber. These materials have a higher resistance to ozone and can also be used at extremely low temperatures.

Further advantages and advantageous embodiments are specified in the description, the drawings, and the claims. Here in particular the combinations of features specified in the description and in the drawings are purely exemplary, so that the features can also be present individually or combined in other ways.

In the following the invention is described in more detail using the exemplary embodiments depicted in the drawings. Here the exemplary embodiments and the combinations shown in the exemplary embodiments are purely exemplary and are not intended to define the scope of the invention. This scope is defined solely by the pending claims.

DETAILED DESCRIPTION

In the following, identical or functionally equivalent elements are designated by the same reference numbers.

Figure 1:
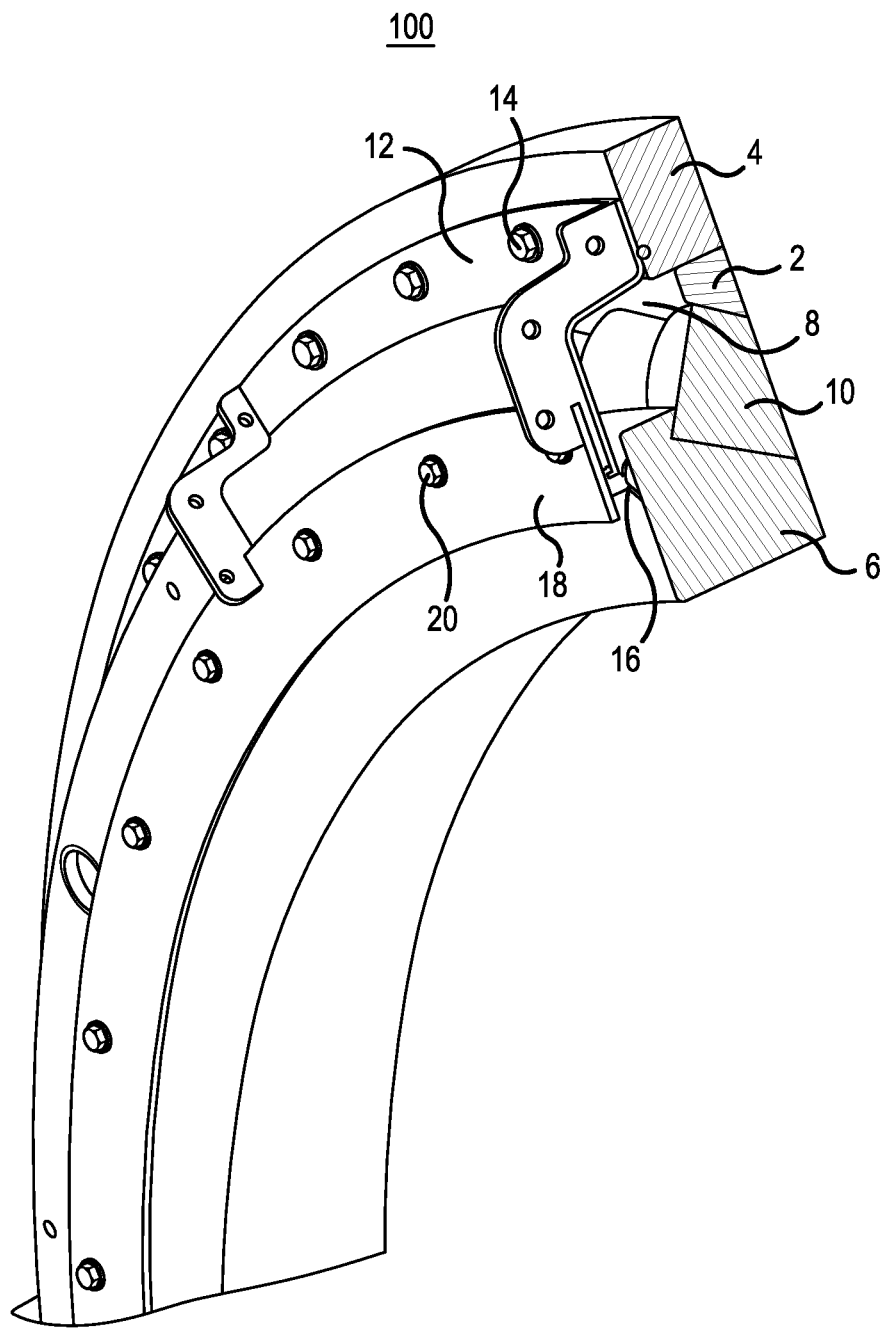
FIG. 1 is a schematic perspective partial view of a rolling-element bearing assembly according to a first exemplary embodiment.

FIG. 1 schematically shows a perspective partial view of a rolling-element bearing assembly 100 including an outer ring 2, which is connected to a shaft 4 such that they rotate together, and an inner ring 6, wherein outer ring 2 and inner ring 6 form a bearing interior 8 between them, wherein rolling elements 10 are disposed.

Figure 2:
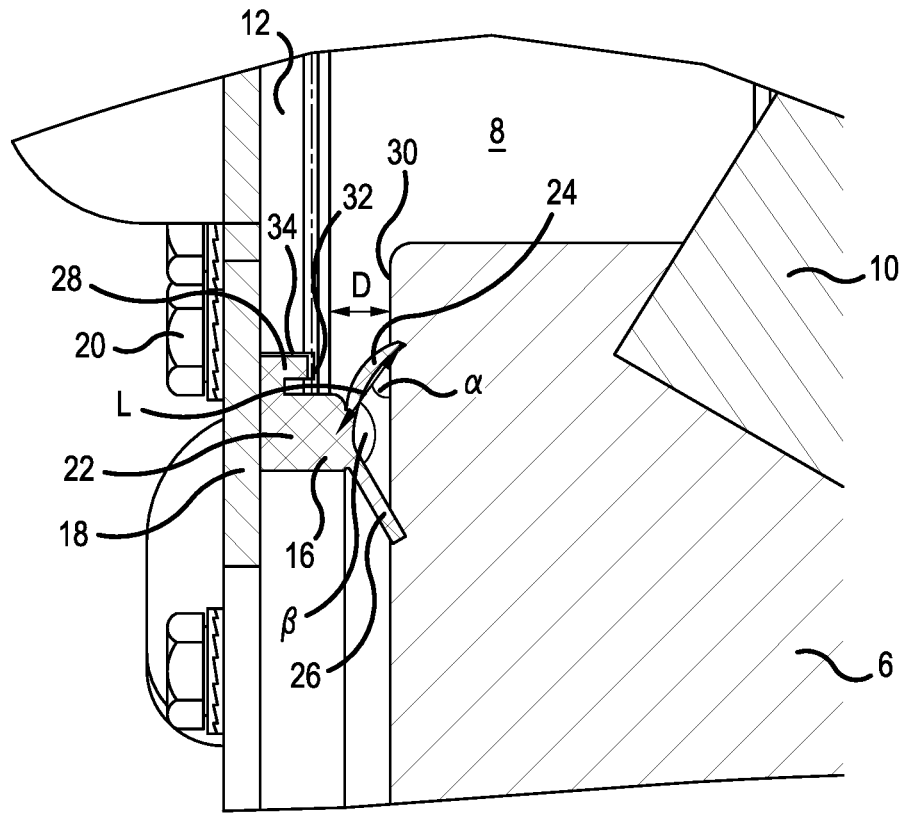
FIG. 2 is a schematic sectional view of the rolling-element bearing assembly of FIG. 1.

In order to protect the bearing interior 8 from contamination by dirt, water, or particles generally, and in order to retain an optional lubricant in the bearing interior 8, the bearing interior 8 must be sealed outwardly. For this purpose a seal carrier 12 is usually attached to the outer ring 2 or the shaft 4, which seal carrier 12 is attached in the exemplary embodiment shown in FIG. 1 by screws 14 and at least partially covers the bearing interior 8. Here the seal carrier 12 extends from the bearing outer ring 2 or shaft 4 to the bearing ring 6 and carries a seal element 16. This design is also depicted enlarged in the sectional view of FIG. 2, wherein, however, FIG. 2 shows only the bearing inner ring 6, the rolling element 10, but not the outer ring 2. Furthermore the seal carrier 12 is depicted in FIG. 2, which seal carrier 12 carries a seal element 16.

In the exemplary embodiments depicted in the figures the seal element 16 is configured as an axial seal element. However, it is also possible to form the seal element as a radial shaft seal ring.

In order to attach the seal element 16 to the seal carrier 12 such that they rotate together, a clamping ring 18 is furthermore provided that is in turn attached circumferentially to the seal carrier 12 by screws 20 such that the seal element 16 is clamped between seal carrier 12 and clamping ring 18. The seal element itself is also attached by the screws 20 to the clamping ring 18 in the circumferential direction such that the seal element and the clamping ring 18 rotate together and the seal element is attached at an axially defined distance to the bearing inner ring 6. The various attachment possibilities are discussed in more detail below.

Figure 3:
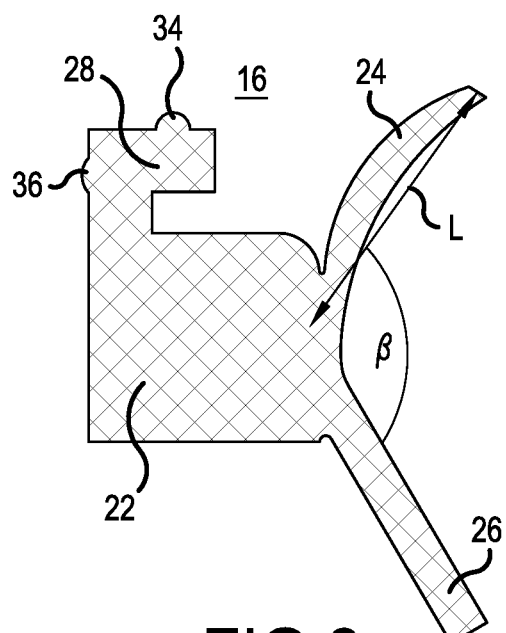
FIG. 3 is a schematic perspective detail view of the seal element used in FIG. 1 and FIG. 2.

As can be seen from FIG. 2 and FIG. 3, the seal element 16 includes a seal body 22 that carries a primary seal lip 24 and a secondary seal lip 26. In the exemplary embodiment, seal bodies 22 and seal lips 24, 26 are formed one-piece, but it is also possible to manufacture the seal elements 16 from a plurality of parts. In the exemplary embodiment shown, the seal body 22 has a structure 28 in the form of a flange that interacts with the seal carrier 12 in order to axially and radially secure the seal body 22, and thus the seal element 16, on the seal carrier 12.

Furthermore FIG. 2 shows that the primary seal lip 24 and the secondary seal lip 26 are not oriented radially as usual, but rather slip axially against an end surface of the inner ring 6. This is unusual since up to now the persons skilled in the art have assumed that an axial seal or an axially extending primary seal 24 cannot exert sufficient contact force against the end surface 30 or another axial surface to securely and reliably protect the bearing interior 8 from contamination from outside and to hold a lubricant, optionally located in the bearing interior 8, therein.

However, it has surprisingly been found that the seal lip can be formed such that it can also exert a sufficient contact force in the axial direction. In addition to the distance D between seal carrier 12 and end side 30, the material of the seal element, and in particular of the primary seal lip, its length L1, its angle of incidence α with respect to the end surface 30, its geometric design, and its spread angle β with respect to the secondary seal lip 26 also play a important role. In order to obtain a particularly good contact force, the contact force achieved and its behavior over the entire service life of the bearing is simulated for the seal element, and the parameters are adapted accordingly.

Thus, for example, the primary seal lip 24 depicted in FIG. 2 and enlarged in FIG. 3 shows a geometric design having a shape curved slightly outward and thickened in the center, and has a lip-spread angle β of approximately 120° with respect to the secondary seal lip 26. Furthermore, the distance D between seal carrier 12 and end surface 30 of the bearing inner ring 6 is set such that even with a long service life at high load the seal lip 24 is always in contact with the end surface 30. Furthermore it is preferred that the angle of incidence α of the primary seal lip 24 with respect to the end surface 30 of the bearing inner ring 6 falls approximately in the range between 20° and 60°. Furthermore it has been found to be preferred to manufacture the seal element and in particular the primary seal lip 24 from an elastic material, preferably nitrile butadiene rubber or hydrogenated acrylonitrile butadiene rubber. These materials have sufficient strength, high elasticity, and high smoothness, so that the seal lip sealingly abuts against the end surface 30 over its service life without being damaged due to high frictional torque or hindering the rotation of the bearing components. In addition, these materials show high resistance to ozone and can also be used at low temperatures.

In order to attach the seal element 16 to the seal carrier 12, in the exemplary embodiment of FIG. 2 it is furthermore depicted that the seal carrier 12 includes an undercut 32 that interacts with the structure 28, i.e., the flange, of the seal body 22, in order to radially and axially secure the seal element 16. Furthermore the undercut forms a type of labyrinth seal together with the flange 28, which labyrinth seal further seals the bearing interior 8. In order to additionally seal the bearing interior 8, as can also be seen in particular from the enlarged depiction of the seal lips in FIG. 3, a radially extending projection 34 is formed on the seal element 16 in the region of the structure 28, and an axially extending projection 36 is formed in the region of the seal body 22, to ensure an additional sealing between seal element 16 and clamping ring 18 or seal carrier 12. In addition, the seal body 22 can also be adhered to the clamping ring 18 and/or the seal carrier.

As already mentioned above, to establish the contact force of the primary seal 24, the distance D between the seal carrier 12 and the end surface 30 of the bearing inner ring is important, among other things. In the bearings known from the prior art, the seal carrier 12 is manufactured from a metal plate, which, however, especially in large rolling-element bearings, is slightly bent, so that in conventional bearings the distance D varies greatly over the circumference. With an axially extending seal this variation causes the primary seal lip 24 to not always abut against the end surface 30 of the bearing inner ring 6, but rather to be spaced therefrom. An axial seal assembly has therefore never been considered by the persons skilled in the art.

In order to reduce the axial imbalance as much as possible, it is therefore further proposed to manufacture the seal carrier 12 not from a metal-plate material, as known from the prior art, but rather from a fiber-reinforced plastic, in particular from fiberglass-reinforced plastic (FRP). FRP has the property that on the one hand it is light, whereby the total weight of the large rolling-element bearing can be reduced, but on the other hand is very stable and free of deformations, so that even with large rolling-element bearings the distance D between seal carrier 12 and end surface 30 can be precisely set and held constant over the circumference. Here it has been found to be advantageous not to laminate, as is usual, the FRP material, but rather to compression mold it from a fiber-matrix-composite plate, which in particular increases the dimensional stability and precision of manufacturing.

However, such a seal carrier 12 manufactured from fiber-reinforced plastic, in particular from FRP material, can also be used as a seal carrier for radial shaft seals.

Furthermore, the seal carrier 12 can be formed one-part or multi-part, and further structures, such as, for example, venting bores, lubricant supply bores, endoscopy bores, etc., can be directly formed during the manufacturing process.

Figure 4A:
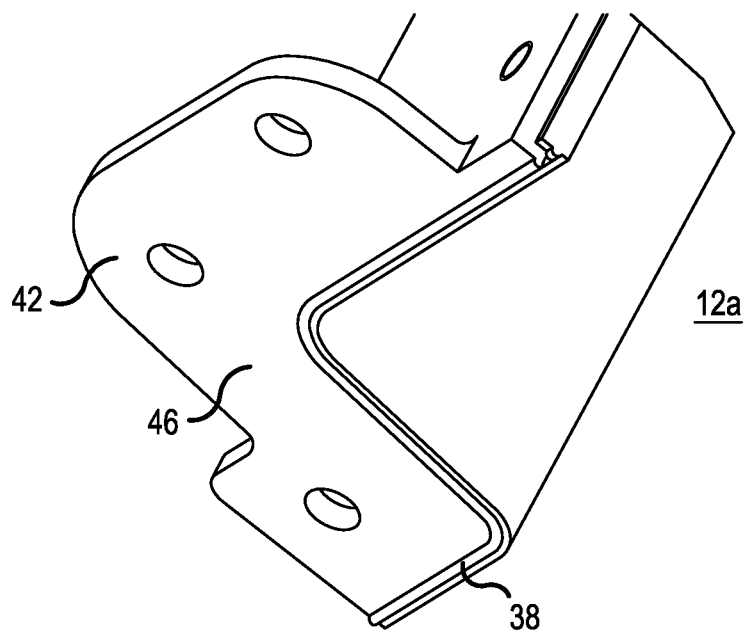
FIGS. 4A and 4B are schematic detail views of a seal carrier used in the rolling-element bearing assembly.
Figure 4B:
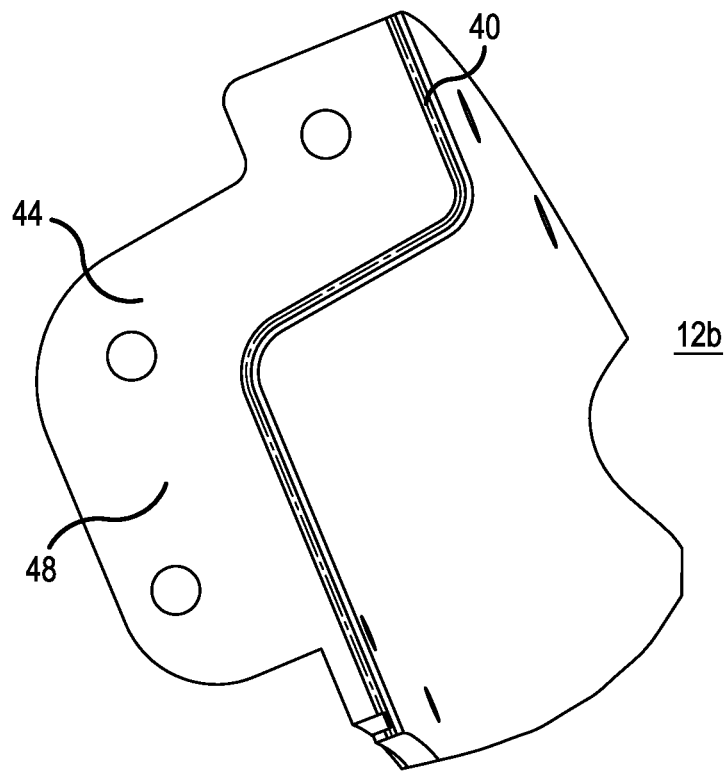

In a multi-part embodiment it is also advantageous that, as depicted in FIGS. 4A and 4B, two mutually abutting, adjacent seal carrier segment parts 12a, 12b include mutually complementary structures 38, 40. In the exemplary embodiment depicted in FIGS. 4A and 4B, the mutually complementary structures are realized by a projection 38 and a correspondingly configured groove 40, which engage one-into-the-other during assembly and align the seal carrier segments 12a, 12b to each other radially and axially. Furthermore, a flange element 42, 44 can be attached to each of the seal carrier segments 12a, 12b, which flange elements 42, 44 can be screwed to one another in order to connect the seal carrier segments 12a, 12b to one another. In addition, the joint surfaces 46, 48 of the seal carrier segments, in particular the flange surfaces, can be coated with a seal material, in particular a liquid seal, in order to ensure the sealability of the seal carrier 12 in the circumferential direction. The seal carrier segments 12a, 12b can also be only adhered to each other, wherein the adhesive can then assume both the attaching and the sealing function.

Instead of the depicted tongue-and-groove connection it is of course also possible to form other suitable complementary structures in order to make possible a radial, axial, and/or circumferential fixing and orienting of the seal carrier segments with respect to one another. However, it is particularly advantageous here if the complementary structures include at least one radial and one axial stop, so that the orienting of the seal carrier segments is simplified.

Figure 5:
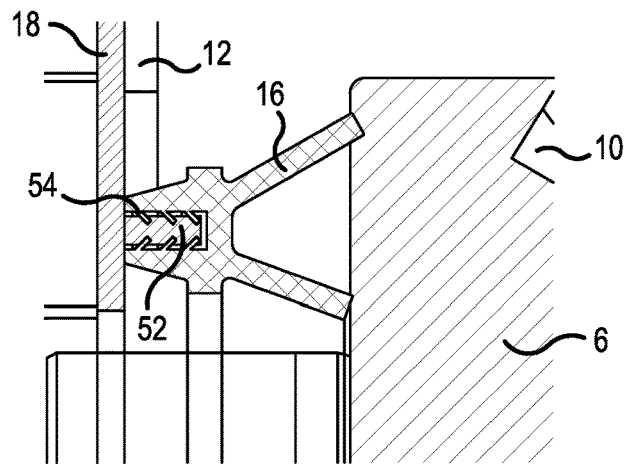
FIG. 5 is a schematic detail view of an alternatively usable seal element.
Figure 6:
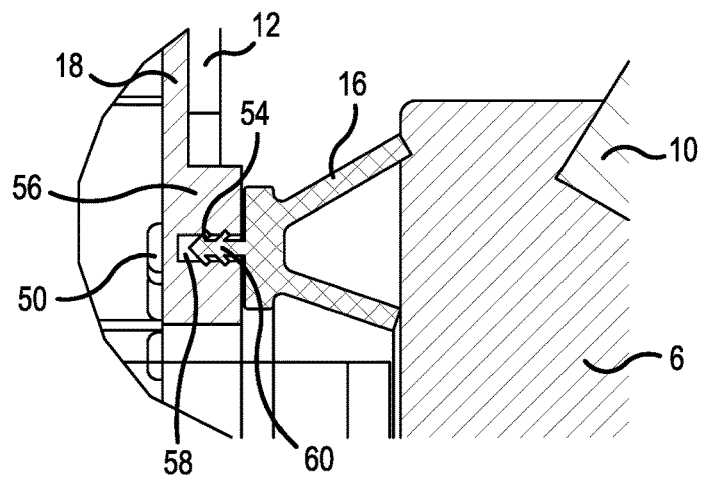
FIG. 6 is a schematic detail view of an alternatively usable seal element.
Figure 7:
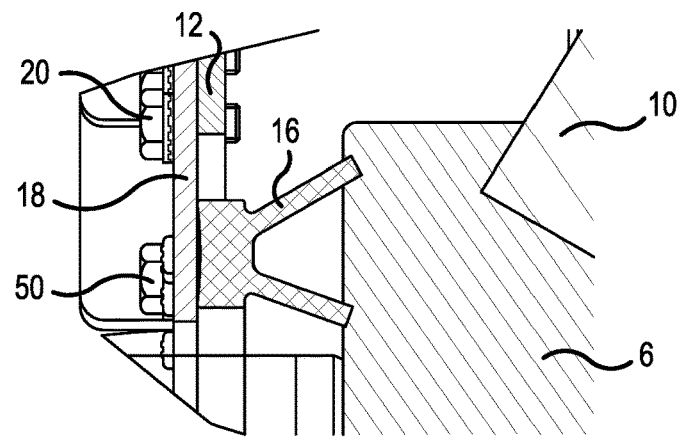
FIG. 7 is a schematic detail view of an alternatively usable seal element.

FIGS. 5, 6 and 7 show further alternative attachment possibilities for the seal element 16 to the seal carrier 12 or the clamping element 18. In the other embodiments shown, the seal element 16 is only connected to the clamping element 18 and is not directly attached to the seal carrier 12. FIGS. 5 and 6 thus each show designs wherein the seal element 16 and the clamping ring 18 are connected to each other in an interference- and friction-fit manner. Here a purely interference- and friction-fit design is shown in FIG. 5, while in FIG. 6 the interference or friction fit is supplemented by a friction-fit with the aid of additional attachment elements 50. In FIG. 5 the clamping ring 18 includes a projection 52 on which the seal element 16, which is equipped with barbs 54, is clamped. On the other hand in the exemplary embodiment of FIG. 6 the clamping ring 18 includes a thickening 56 including a groove 58, into which an extension 60 of the seal element, which extension 60 is also equipped with barbs 54, engages. In addition, the attachment elements 50 are provided that attach the seal element 16 to the clamping ring 18 such that they rotate together. Of course the seal element 16 can also be screwed onto the clamping ring 18 only by the screws 50, as is depicted, for example, in FIG. 7.

A rolling-element bearing assembly as described in FIGS. 1 to 7 is advantageous in particular when the inner ring is configured stationary and the outer ring is configured to rotate, but it can also be used with a stationary outer ring and a rotating inner ring.

Overall, using the presented rolling-element bearing assembly, a large rolling-element bearing assembly can be provided that, with diameters over one meter, makes possible both a weight savings and an improved seal performance. The combination of FRP material, which is in particular compression-molded from a fiber-composite plate, and the axially extending seal makes possible an optimal axial sealing, since due to the FRP seal carrier a particularly precise setting is possible of the distance between seal carrier and end surface of the inner ring.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved bearing assembly and seal.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

REFERENCE NUMBER LIST

100 Rolling-element bearing assembly
2 Outer ring
4 Shaft
6 Inner ring
8 Bearing interior
10 Rolling element
12 Seal carrier
14 Screws
16 Seal element
18 Clamping ring
20 Screws
22 Seal body
24 Primary seal lip
26 Secondary seal lip
28 Structure
30 End surface
32 Undercut
34, 36 Seal projection
38, 40 Complementary structures
42, 44 Flange element
46, 48 Abutment surfaces
50 Attachment elements
52 Projection
54 Barbs
56 Thickening
58 Groove
60 Projection
D Distance
L Length
$\alpha$ Angle of incidence
$\beta$ Lip-spread angle

What is claimed is:

1. A rolling-element bearing assembly comprising:
a first bearing ring and a second bearing ring that define a bearing interior between the first bearing ring and the second bearing ring,
a plurality of rolling elements disposed in the bearing interior to allow a relative rotation of the first and second bearing rings, and
a seal assembly for sealing the bearing interior, the seal assembly including a seal carrier connected to the first bearing ring such that the seal carrier and the first bearing ring rotate together and a seal element connected to the seal carrier such that the seal element and the seal carrier rotate together, the seal carrier holding the seal element against an axial surface of the second bearing ring,
wherein the seal carrier comprises a fiber-reinforced plastic,
wherein the seal element is circumferentially attached to the seal carrier by a clamping ring,
wherein the second bearing ring is an inner bearing ring having an outer diameter and the first bearing ring is an outer bearing ring,
wherein the seal carrier is connected to the outer bearing ring and the clamping ring has a central opening having an inner diameter, and wherein the inner diameter of the central opening of the clamping ring is less than the outer diameter of the inner bearing ring.

2. The rolling-element bearing assembly according to claim 1, wherein fiber-reinforced plastic comprises a fiberglass-reinforced plastic.

3. The rolling-element bearing assembly according to claim 1, wherein the seal carrier comprises a ring and wherein the fiber-reinforced plastic comprises a compression-molded fiber-matrix-composite.

4. The rolling-element bearing assembly according to claim 1, wherein the seal carrier comprises a plurality of seal carrier segments abutting against one another.

5. The rolling-element bearing assembly according to claim 1, wherein the seal element and/or the clamping ring include structures in order to attach the seal element to the clamping ring such that the seal element and the clamping ring rotate together.

6. The rolling-element bearing assembly according to claim 1,
wherein the seal element includes a primary seal lip and a secondary seal lip, and
wherein the primary seal lip and the secondary seal lip abut axially against the axial surface of the second bearing ring.

7. The rolling-element bearing assembly according to claim 6, wherein the primary seal lip abuts against the axial surface of the second bearing ring with a predetermined contact force.

8. The rolling-element bearing assembly according to claim 6, wherein the contact force of the primary seal lip is determined by a length of the primary seal lip, an angle of incidence of the primary seal lip with respect to the end surface, a material of the primary seal lip, a geometric design of the primary seal lip, and/or a defined distance of the seal carrier to the end surface of the second bearing ring.

9. The rolling-element bearing according to claim 1,
wherein the fiber-reinforced plastic comprises a compression-molded fiber-matrix-composite,
wherein the seal carrier comprises a plurality of seal carrier segments abutting against one another,
wherein the seal carrier segments include abutment surfaces having mutually complementary structures,
wherein the seal element is circumferentially attached to the seal carrier by a clamping ring,
wherein the seal element includes a primary seal lip and a secondary seal lip, and
wherein the primary seal lip and the secondary seal lip abut axially against the axial surface of the second bearing ring with a predetermined contact force.

10. The rolling-element bearing according to claim 1,
wherein the seal element is located entirely radially outward of the central opening.

* * * * *